United States Patent [19]
Minegishi

[11] 3,875,634
[45] Apr. 8, 1975

[54] PROCESS FOR PRODUCING AN OIL SEAL TO BE APPLIED TO THE ROTARY PISTON ENGINE

[75] Inventor: Hiroshi Minegishi, Kawagoe, Japan

[73] Assignees: Nippon Piston Ring Co., Ltd., Tokyo; Toyo Kogyo Company, Limited, Hiroshima, both of Japan

[22] Filed: Feb. 14, 1974

[21] Appl. No.: 442,521

Related U.S. Application Data

[62] Division of Ser. No. 224,551, Feb. 8, 1972, Pat. No. 3,824,662.

[30] Foreign Application Priority Data
Feb. 8, 1971   Japan.................................. 46-4739

[52] U.S. Cl. ......... 29/156.6; 29/527.4; 29/DIG. 36; 277/96 R; 277/236
[51] Int. Cl............................................. B23p 15/06
[58] Field of Search....... 29/156.6, 156.63, 156.7 A, 29/527.2, 527.4, DIG. 12, DIG. 26, DIG. 36, DIG. 39; 277/81 R, 96 R, 96 A, 236

[56] References Cited
UNITED STATES PATENTS

| | | |
|---|---|---|
| 2,248,530 | 7/1941 | Granger et al................. 29/DIG. 12 |
| 2,380,654 | 7/1945 | Lane et al.......................... 29/156.6 |
| 3,337,938 | 8/1967 | Prasse........................... 28/527.4 X |
| 3,421,198 | 1/1969 | Prasse.............................. 29/156.6 |
| 3,435,502 | 4/1969 | Thompson et al.............. 29/156.63 |
| 3,715,790 | 2/1973 | Reinberger.................... 29/DIG. 39 |

OTHER PUBLICATIONS

D. Reichard, "New Process Simultaneously Plates and Hones Parts Quickly and Economically," Machinery, Sept. 1972, pp. 37–41.

*Primary Examiner*—C. W. Lanham
*Assistant Examiner*—D. C. Reiley, III
*Attorney, Agent, or Firm*—Sughrue, Rothwell, Mion, Zinn & Macpeak

[57] ABSTRACT

A process for producing an oil seal for use in a rotary piston engine, which comprises the steps of forming an inner peripheral surface of an oil seal base body into an angled circumferential surface solid angle of 2 $\theta$ from a sliding surface side of the body toward a rear surface side or into an indented circumferential surface cut out partly the inner peripheral surface on the rear surface side along the inner peripheral surface plating a hard metal layer on the slant or indented inner circumferential surface, and then horning exclusively a partial zone of the plated layer surface on the sliding surface side.

2 Claims, 21 Drawing Figures

PROCESS FOR PRODUCING AN OIL SEAL TO BE APPLIED TO THE ROTARY PISTON ENGINE

This application is a division of application Ser. No. 224,551, filed Feb. 8, 1972, now U.S. Pat. No. 3,824,662.

BACKGROUND OF THE INVENTION

1. Field of the Invention

This invention pertains to a process for producing an improved seal for use with rotary piston engines for sealing the sides of the rotary piston relative to the side of the piston housing to prevent the passage of lubricating oil into the combustion chamber.

2. Description of the Prior Art

As well known, the purpose of the oil seal used in a rotary piston engine is to maintain an oil-tight relationship between a stationary side housing and a rotor. The oil seal is generally composed of a radially inner oil seal and a radially outer oil seal each being assembled with an O-ring 5 in a U-shaped channel formed in the seal and a spring for biasing the ring into engagement with the side housing. This oil seal assembly is applied to an oil seal groove in the rotor.

When proper oil-tightness between the side housing and the rotor is not fully obtained by the oil seal assembly, consumption of the lubricating oil increases, with unforeseen problems arising in the engine operation caused by carbon sludge which is produced by the combustion of the lubricating oil flowing into the combustion chamber.

Many investigations and developments on the oil seal have been carried out in order to eliminate the above-mentioned defects. One improved oil seal assembly construction shown in FIGS. 1, 2C and 3C, has the radially inner peripheral surface 32 of the oil seal 3 or 4 coated with a very hard metal layer 33, e.g., a hard Cr plated layer, a Mo sprayed or a nitrided layer, with the sliding surface 31 facing to the side housing 1 being formed at an angled surface 311 inclining with a rip angle of $\alpha$ from an edge 341 of the radially inner peripheral surface 32 on the sliding surface side and increasing towards the radially outer peripheral surface side. The edge 341 of the hard metal coated layer 33 therefore slides on an inner wall face of the side housing 1 while maintaining intimate contact with the face during the rotation of the rotor 2.

The width of the contact area between the oil seal of this type and the inner wall face of the side housing is always kept constant and does not exceed the thickness of the hard metal coated layer, due to an abrasion difference between the oil seal base body and the hard metal coated layer caused by the hardness difference between them. Accordingly, the oil-tightness between the side housing 1 and the rotor 2 is favorably maintained.

The process for producing this improved oil seal for rotary piston engines has one major drawback, however. Since the manufacturing steps include a preliminary step for forming a base metal into an oil seal base body, plating step for providing a hard metal layer on the radially inner peripheral surface of the oil seal base body, a honing step for smoothing the rough surface of the plated hard metal layer into a fine smooth surface, and a finishing step for obtaining the final desired shape of the oil seal, including the rip cutting of the angled side, a considerable increase in manufacturing time is required. Specifically, the honing treatment step applied to the entire surface of the plated hard metal layer generally requires 16–20 minutes. Consequently, this increase in time raises the cost of the oil seal product.

SUMMARY OF THE INVENTION

An object of this invention is to provide a novel process for producing an oil seal for a rotary engine and which decreases the time required for honing the plated hard metal surface layer and thus reduces the cost of the resulting oil seal product.

According to the process of this invention, the preliminary working comprises the steps of forming the radially inner peripheral surface of the oil seal base body into an angled planar surface forming a predetermined angle, designated as $2\theta$ with the sliding surface side of the body towards the rear surface side of the same or into an indented circumferential surface partially cut out of the radially inner peripheral surface on the rear surface side, leaving a zone extending along the radially inner peripheral surface. The honing treatment step is applied exclusively to the surface of the plated hard metal layer provided on the rear surface zone side.

DESCRIPTION OF PERFERRED EMBODIMENTS

Figure 1:
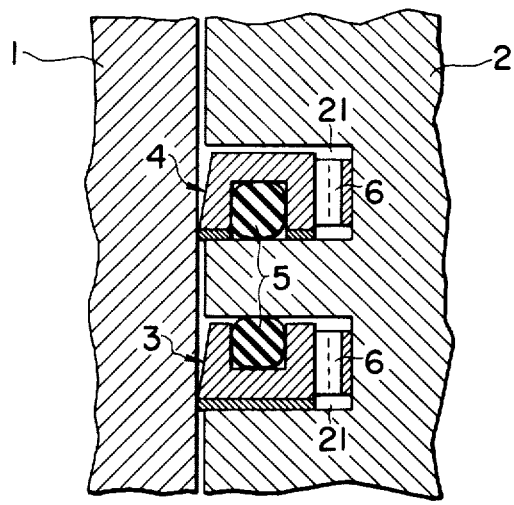
FIG. 1 shows a partly enlarged vertical cross-sectional view of an oil seal assembly assembled in a rotary piston engine.

The preferred embodiments of the present invention will now be described with reference to the accompanying drawings. As seen in FIG. 1, a rotary piston engine has a stationary housing 1, within which a piston 2 rotates. An oil seal assembly consisting of an inner oil seal 3 and an outer oil seal 4 is located in slots or grooves 21 cut in the sides of the rotary piston 2 around the axis of rotation thereof.

Figure 4A:
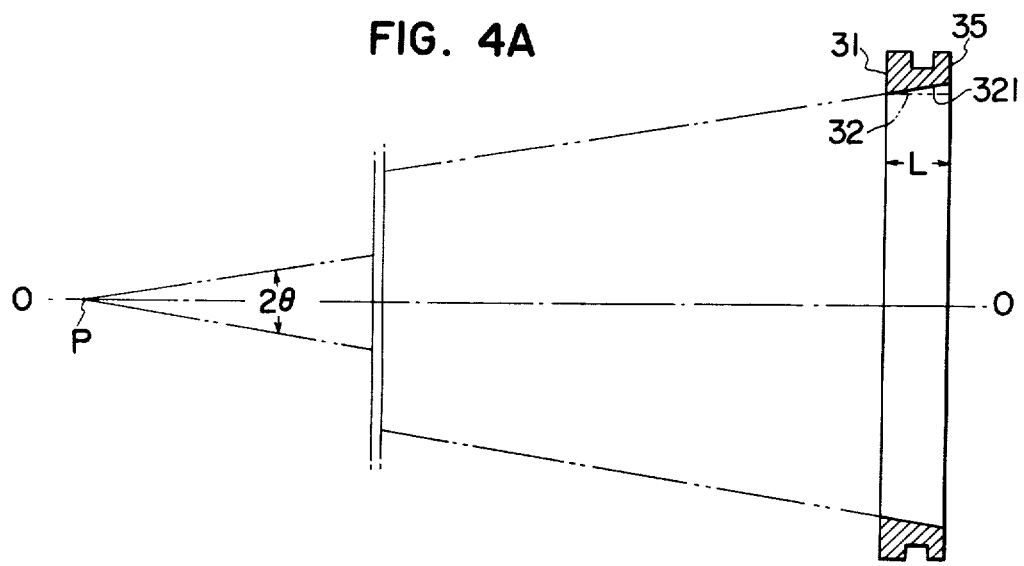
FIGS. 4A, 4B and 4C are explanatory views of the steps of a process for producing an inner oil seal according to this invention, showing vertical cross sections of the oil seal and its base body.
Figure 4B:
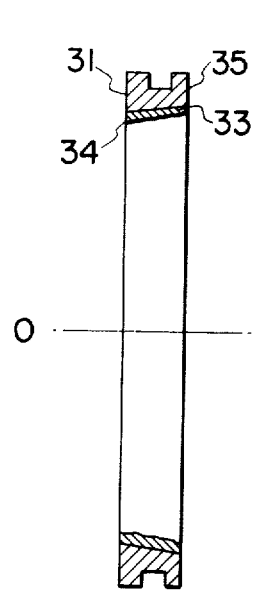

A radially inner peripheral surface 32 of the inner oil seal base body is formed at an angle $\theta$ relative to the central axis of the ring, the angled circumferential surface 321 forming a solid angle of $2\theta$ from the side of sliding surface 31 toward the side of rear surface 35 as shown in FIG. 4A. The surface 321 is provided with a Cr layer 33 by plating as shown in FIG. 4B with the surface of Cr plated layer also slanting relative to the surface 321. Thereafter, a honing treatment for making the Cr plated layer surface into a fine smooth surface is applied exclusively to a partial zone of the Cr plated layer surface 331 extending along the inner periphery of the oil seal with a width of $l$ from the edge of the surface 341 on the side of sliding surface 31 as shown in the FIG. 4C. The sliding surface 31 may be cut at an angle $\alpha$ relative to the perpendicular plane as described above in the prior art, if desired.

Figure 5A:
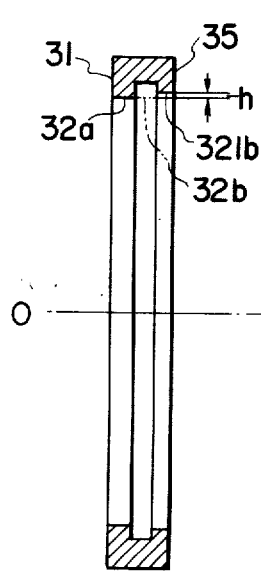
FIGS. 5A, 5B and 5C are explanatory views of the steps of a process for producing an outer oil seal according to this invention, showing vertical cross sections of the oil seal and its base body.
Figure 5B:
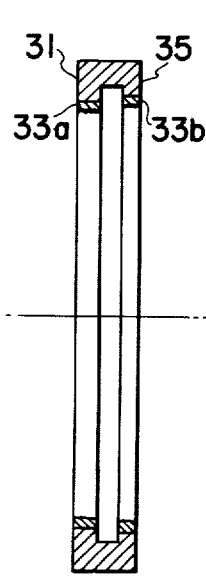
Figure 5C:
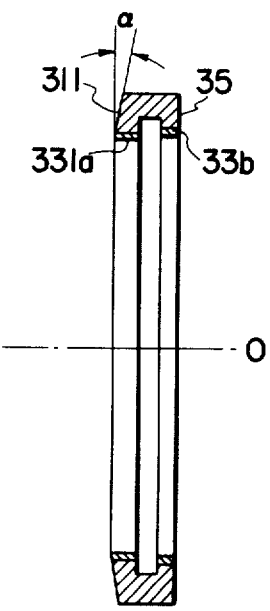

The radially inner peripheral surface of the outer oil seal base body 4 is formed into a stepped circumferential surface having two inner peripheral surfaces 32a and 32b of different diameters at both sides of the inner peripheral surface. The outer-most surface 32a has a width of $l$ from the edge of said inner peripheral surface 31 on the sliding surface side, and the inner-most surface 32b on the side of rear surface 35 is formed into a recessed surface 321b by cutting out the surface 32b with a depth from the diameter of surface 32a along the surface 32b as shown in FIG. 5A. Both surfaces 32a and 321b are then provided with Cr layers 33a and 33b respectively by plating as shown in FIG. 5B, and thereafter the honing treatment is applied exclusively to a surface 331a of the former Cr plated layer 33a on the side of the sliding surface 31 as shown in FIG. 5C.

According to the above described processes of this invention, the time required for honing is greatly reduced as compared with the conventional processes.

The sealing ability of this special oil seal will be compared in the following tables and in FIGS. 6A and 6B with that of the conventional oil seal rings. Generally, the oil sealing ability of an oil seal is determined on the basis of the consumption of the lubricating oil during actual engine operation.

Figure 6A:
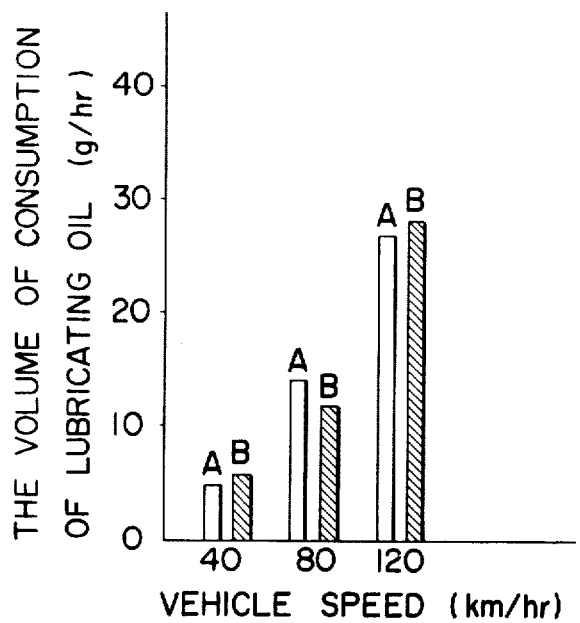
FIGS. 6A and 6B are graphs comparing the sealing ability of a conventional oil seal assembly shown in FIGS. 2C and 3C with that of the oil seal assembly of this invention shown in FIGS. 4C and 5C.
Figure 6B:
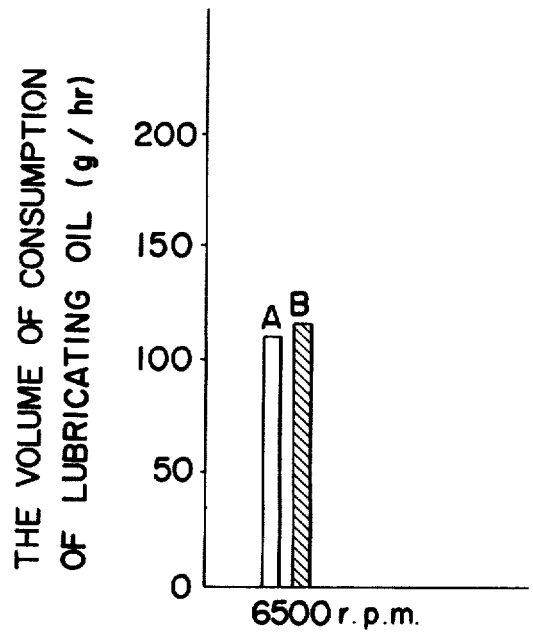
Figure 7A:
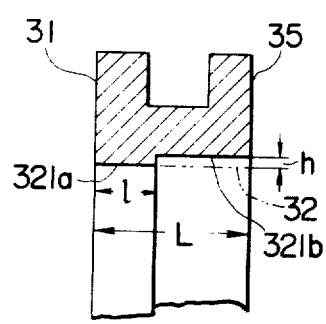
FIGS. 7A, 7B and 7C are explanatory sectional views of an oil seal, showing a process for producing a second type of inner oil seal according to this invention.
Figure 7B:
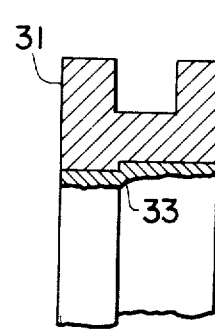
Figure 7C:
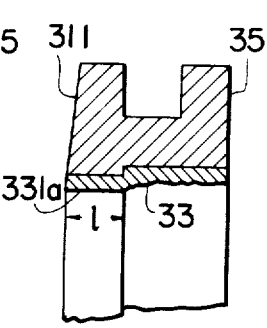
Figure 8A:
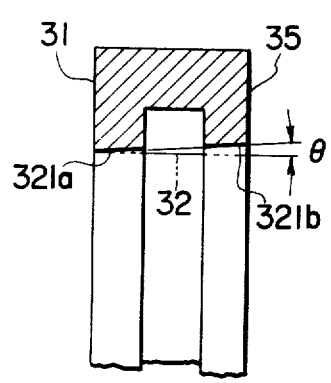
FIGS. 8A, 8B and 8C are explanatory sectional views of an oil seal, showing a process for producing a second type of outer oil seal according to this invention.
Figure 8B:
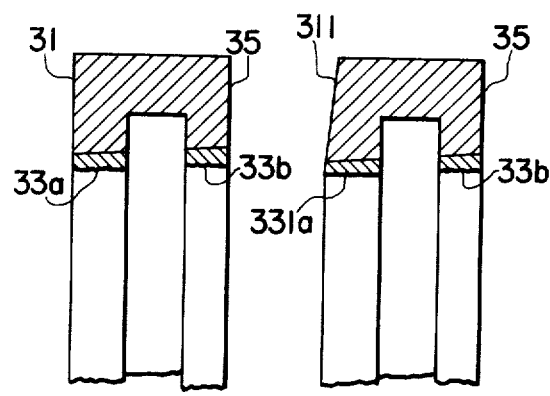
Figure 8C:
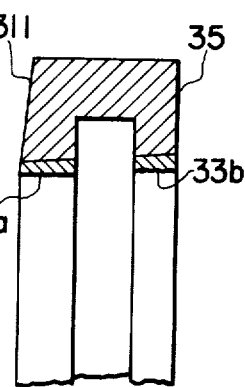

FIGS. 6A and 6B show graphs comparing the amount of lubricating oils consumed in a rotary piston engine with the oil seal of this invention with that of the conventional oil seal.

The values for $\theta$, $l$ and $h$ of the oil seal of this invention used in the test for the lubricating oil consumption are shown in Table 1 below:

Table 1

| Outer oil Seal Ring | | Inner Oil Seal Ring | |
|---|---|---|---|
| h | 0.1 mm | $\theta$ | 2° |
| | | $l$ | ⅙L |

L is the width of the inner peripheral surface of the oil seal ring

The engine used for testing the oil seal is the "M10A type Rotary Engine" having the following specifications;

Table 2

| | |
|---|---|
| Total exhaustion volume or displacement: | 491 cc × 2 |
| maximum output: | 100 ps/7,000 r.p.m. |
| maximum torque: | 13.5 kg-m/3,000 r.p.m. |
| compression ratio: | 9.4:1 |

Figure 2A:
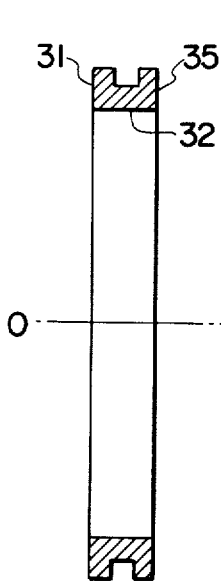
FIGS. 2A, 2B and 2C are vertical cross-sectional views of a conventional inner oil seal, showing the sequential steps for producing the oil seal and its base body.
Figure 2B:
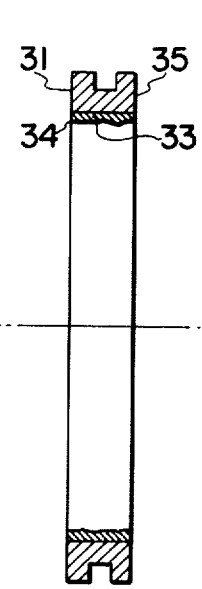
Figure 2C:
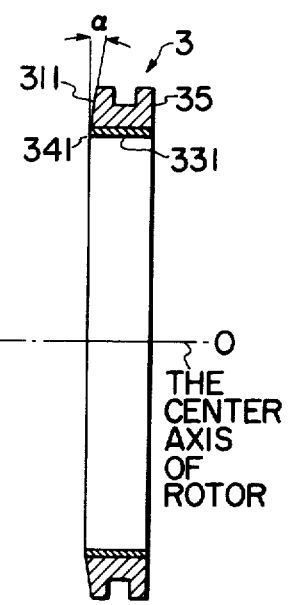
Figure 3A:
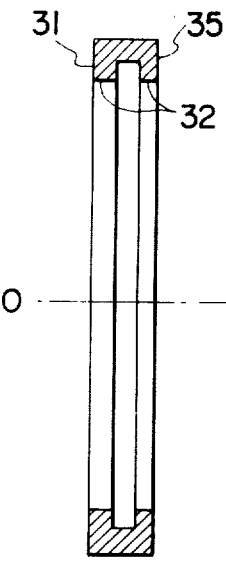
FIGS. 3A, 3B and 3C are vertical cross-sectional views of a conventional outer oil seal, showing the sequential steps for producing the oil seal and its base body.
Figure 3B:
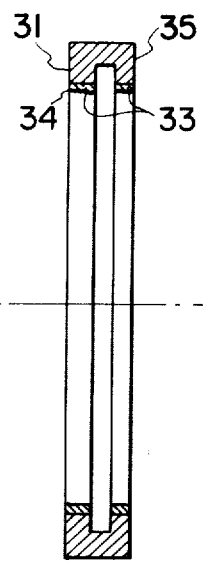
Figure 3C:
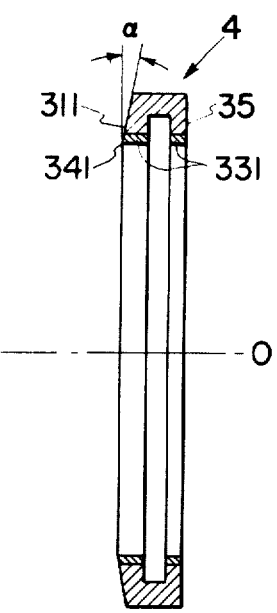
Figure 4C:
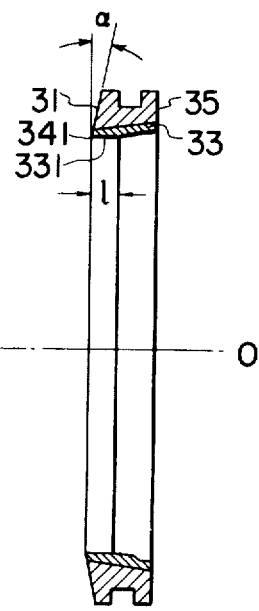

Plain columns A in FIGS. 6A and 6B show the test results on the conventional oil seal assembly composed of the inner oil seal shown in FIG. 2C and the outer oil seal shown in FIG. 3C, when applied to above said "M10A" type rotary engine, whereas cross-hatched columns B in FIGS. 6A and 6B show the test results on the oil seal assembly constructed according to the process of this invention composed of the inner and outer oil seal shown in FIGS. 4C and 5C respectively and Table 1.

The conditions for operating the "M10A" type rotary engine are shown in Table 3.

Table 3

| | Boost Pressure | Output | Running Time |
|---|---|---|---|
| 40 k/mhr. running | −400 mmHg | 4.1 ps | 6 hr. |
| 80 km/hr. " | −350 " | 13.4 " | 3 " |
| 120 km/hr. " | −200 " | 32.9 " | 2 " |
| 50 ps load/6500 r.p.m. | — | 50.0 " | 5 " |

It is apparent from FIGS. 6A and 6B that almost equal lubricating oil consumptions are obtained with use of the conventional oil seal and the novel oil seal ring of the present invention. Therefore, the present invention provides an oil seal having favorable oil sealing qualities quite comparable with that of the conventional oil seal, while being produced at lower cost due to the reduction of time required for the honing treatment step.

The optimum ranges obtained by many tests in which the solid angle 29 of the radially inner circumferential surface, the depth $h$ cut out of the inner peripheral surface on the rear surface side, and the width $l$ of the Cr plated layer surface to be subjected to the honing treatment were changed as follows:

$\theta$ : 1° 45′ − 2° 15′

$l$ : ¼ − ⅓ of the entire width L of the inner peripheral surface of the oil seal $h$ : 0.1 mm − ⅓ of the depth of the groove in which is inserted an O ring 5

As a result of the tests, the process of the present invention brings about a reduction in the time required for honing to approximately 6–8 minutes.

Thus, an oil seal having an equally favorable oil sealing ability as that of the conventional oil seal can be manufactured in a shorter period of time and with lower cost by applying the process of this invention.

Although this invention has been described with regard to an oil seal having the radially inner peripheral surface plated with Cr layer, it will be understood to one skilled in the art that the layer will not be restricted only to a Cr plated layer but may be any one of the hard metallic layers, such as Mo sprayed layer, surface nitrided layer and the like.

Although an exemplified embodiment of this invention has been described with reference to the radially inner oil seal having an angled radially inner circumferential surface as shown in FIGS. 4A − 4C and the radially outer oil seal having the indented inner peripheral surface as shown in the FIGS. 5A − 5C, the radially inner angled circumferential surface and the radially inner indented circumferential surface can be duly applied to the inner oil seal and the outer oil seal, respectively, as shown in FIGS. 7A to 7C and FIGS. 8A to 8C without varying from the scope of this invention.

What is claimed is:

1. A process for producing an oil seal for use in a rotary piston internal combustion engine comprising the steps of: forming an inner peripheral surface of an oil seal base body into a stepped circumferential surface having two inner peripheral surface portions at respective sides of different diameters, one of said inner peripheral surface portions having a predetermined width from the end of said inner peripheral surface on the sliding surface side and the other stepped surface portion being located on the rear surface side of said body, forming an annular recess between said inner peripheral surface portions, said recess acting as an O-ring groove, plating a hard metal layer on both inner peripheral surface portions, and honing exclusively the surface of the hard metal layer plated on said inner peripheral surface on the sliding surface side thereof.

2. A process according to claim 1, wherein the depth of the step is in the range of 0.1 mm to ⅛ of the depth of said O-ring groove formed therein.

* * * * *